(12) United States Patent
Pelzer et al.

(10) Patent No.: US 12,647,744 B1
(45) Date of Patent: Jun. 2, 2026

(54) SELF-CALIBRATING AUDIO

(71) Applicant: Apple Inc., Cupertino, CA (US)

(72) Inventors: Soenke Pelzer, Los Gatos, CA (US);
David E. Romblom, Boulder, CO (US);
Dirk Schroeder, San Jose, CA (US);
Juha O. Merimaa, San Mateo, CA
(US); Jonathan D. Sheaffer, San Jose,
CA (US)

(73) Assignee: Apple Inc., Cupertino, CA (US)

( * ) Notice: Subject to any disclaimer, the term of this
patent is extended or adjusted under 35
U.S.C. 154(b) by 529 days.

(21) Appl. No.: 18/156,934

(22) Filed: Jan. 19, 2023

Related U.S. Application Data

(60) Provisional application No. 63/305,475, filed on Feb.
1, 2022.

(51) Int. Cl.
| | |
|---|---|
| *H04R 5/033* | (2006.01) |
| *G06T 15/06* | (2011.01) |
| *G06T 17/00* | (2006.01) |
| *G06T 19/00* | (2011.01) |
| *H04S 1/00* | (2006.01) |
| *H04S 7/00* | (2006.01) |

(52) U.S. Cl.
CPC .............. *H04S 7/301* (2013.01); *G06T 15/06*
(2013.01); *G06T 17/00* (2013.01); *G06T 19/00*
(2013.01); *H04R 5/033* (2013.01); *H04S
1/007* (2013.01); *H04S 7/306* (2013.01); *H04S
7/307* (2013.01); *H04S 2400/11* (2013.01);
*H04S 2400/15* (2013.01)

(58) Field of Classification Search
CPC ......... G04S 7/301; G06T 15/06; G06T 17/00;
G06T 19/00; H04R 5/033; H04S 1/007;
H04S 7/306; H04S 7/307; H04S 2400/11;
H04S 2400/15
USPC ........................................................ 381/303
See application file for complete search history.

(56) References Cited

U.S. PATENT DOCUMENTS

| | | | |
|---|---|---|---|
| 11,417,347 B2 | 8/2022 | Johnson et al. | |
| 11,523,244 B1 | 12/2022 | Meade et al. | |
| 2017/0223478 A1* | 8/2017 | Jot .......................... | G10L 19/20 |
| 2021/0136510 A1* | 5/2021 | Tang ...................... | H04S 7/305 |
| 2021/0329381 A1* | 10/2021 | Holman ................ | G10L 19/008 |

OTHER PUBLICATIONS

Unpublished U.S. Appl. No. 17/469,255, filed Sep. 8, 2021, 29
pages.
Unpublished U.S. Appl. No. 17/821,743, filed Aug. 23, 2022, 31
pages.
Unpublished U.S. Appl. No. 17/821,022, filed Aug. 19, 2022, 38
pages.

* cited by examiner

*Primary Examiner* — Carolyn R Edwards
*Assistant Examiner* — Friedrich Fahnert
(74) *Attorney, Agent, or Firm* — Aikin & Gallant, LLP

(57) ABSTRACT
A ray trace simulation may be performed using a model of
a user's environment. A decay rate of the environment may
be measured in one or more microphone signals that capture
sound in the user's environment. A room impulse response
of the environment may be generated from the ray trace
simulation. The model of the environment may be modified
based on the decay rate of the environment and the room
impulse response.

20 Claims, 5 Drawing Sheets

PERFORM A RAY TRACE SIMULATION BASED ON A MODEL OF AN ENVIRONMENT 402

DETERMINE A DECAY RATE OF THE ENVIRONMENT BASED ON A MICROPHONE SIGNAL 404

GENERATE A ROOM IMPULSE RESPONSE OF THE ENVIRONMENT FROM THE RAY TRACE SIMULATION 406

MODIFY THE MODEL OF THE ENVIRONMENT BASED AT LEAST ON THE DECAY RATE OF THE ENVIRONMENT AND THE ROOM IMPULSE RESPONSE OF THE ENVIRONMENT 408

SELF-CALIBRATING AUDIO

CROSS REFERENCE TO RELATED APPLICATION

This application claims the benefit of U.S. Provisional Patent Application No. 63/305,475 filed Feb. 1, 2022 which is incorporated by reference herein in its entirety.

BACKGROUND

Sound, or acoustic energy, that travels in an acoustic space, such as a room, can reflect off of surfaces. Each time acoustic energy reflects off of a surface, some of the energy may be absorbed by the surface. The acoustic energy can be heard to dissipate over time as it travels through the air (or other medium), reflects, and becomes absorbed by the surfaces. This phenomenon, where a sound is followed by an audible tapering of acoustic energy, is known as reverberation. Although reverberation occurs naturally in places that hold sound, for example, in a concert hall, reverberation can also be electronically added to audio to provide a sense of space to the sound.

Some acoustic energy may travel directly from a sound source to a listener. This may be referred to as direct sound. Other acoustic energy may bounce off of one or more surfaces before being heard by the listener. This acoustic energy can include early reflections and late reflections, and can be referred to as reverberation. The ratio of direct sound to reverberation can be referred to as direct-to-reverberant ratio (DRR).

SUMMARY

Spatial audio can be generated by imitating the effect of a user's body and ear geometry on sound. Reverberation also plays a role in spatial audio. Matching the reverberation in spatial audio to the user's surroundings may improve spatial audio and provide a more plausible listener experience.

The direct-to-reverberant energy ratio (DRR) provides an auditory cue for sound source distance perception in listeners. An immersive spatial audio experience, which can be a component of an augmented reality or mixed reality environment, benefits from a faithful simulation of the user's actual physical space. For example, if a user is present in a small bedroom and spatially produced sound mimics the acoustic behavior of a cathedral, this spatial rendering may not be plausible to a user. The reverberation of the user's room should be properly characterized and used as a basis to produce a proper DRR which in turn provides the illusion of distance in spatial audio. Thus, for spatial audio to provide a plausible distance between a user and a virtual sound source, a reverberation of the user's room should be accurately determined.

In one aspect, a method, includes performing a ray trace simulation based on a model of an environment. A decay rate of the environment (e.g., RT60) is determined based on a microphone signal. A room impulse response of the environment is determined based at least on results from the ray trace simulation. The model of the environment is modified based at least on the decay rate of the environment and the room impulse response of the environment. In such a manner, a model of the user's environment, which is used as an input for ray tracing, may be iteratively improved using the microphone-based decay rate as a reference. With such a method, a computing device may calibrate itself so that it may spatially render audio to resemble the user's environment. A computing device may perform such operations automatically and/or based on user input.

In some aspects, surface absorption (e.g., absorption coefficients) of the model may be adjusted based on this microphone-based decay rate and the room impulse response. The method may be repeated with the modified version of the model of the environment from which an improved room impulse response may be obtained from repeating the ray trace simulation. In such a manner, the method may leverage sounds sensed in the user's space to improve the model of the user's environment, and ultimately, improve spatialization of audio using the room impulse response that is obtained from performing the ray trace simulation with the model.

In some aspects, the model of the environment is built from images of the user's environment captured by a camera. The model is adjusted as described above, based on reverberation sensed by one or more microphones and the room impulse response. The adjusted version of the model can, in turn, be used for another ray trace simulation, to determine an adjusted version of the room impulse response, and so on. In such a manner, the room impulse response 204 may be fine-tuned, having a decay rate and energy that matches or resembles that of the user's environment using both visual and audio information as a reference.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying head related impulse responses (HRIR) (e.g., spatial filters) to audio signals. These HRIRs imitate the effect of a user's body and ear geometry on sound by artificially imparting spatial cues into the audio, such as gains and/or delays for each of a plurality of frequency bands. The spatial cues imitate the diffractions, delays, and reflections that are naturally caused by our body geometry and pinna. The spatially filtered audio can be produced by a spatial audio reproduction system (a spatial audio engine) and output through headphones. Such audio may be perceived by a listener as originating from given direction, such as at a location above, below, or to the side of a listener.

A room impulse response (RIR) characterizes the acoustics of a room and how the room responds to a given sound. A room impulse response can characterize an amount of acoustic energy in a room at different times in response to given sound, on a per sub-band level. Thus, the room impulse response may characterize the reverberation qualities of a given space. The room impulse response of a space varies depending on the geometry of a room, size of a room, objects in the room, and/or surface materials in the room.

The direct-to-reverberant energy ratio (DRR) provides an auditory cue for sound source distance perception in listeners. Depending on this ratio, a sound source can be made to sound far away or close to the listener. As such, an immersive spatial audio experience, which can be a component of an augmented reality or mixed reality environment, benefits from a faithful simulation of the user's actual physical space. For example, if a user is sitting in a small bedroom and spatially produced sound mimics the acoustic behavior of a cathedral, this spatial rendering would not be plausible to a user. Thus, to create a plausible distance between a user and a virtual sound source, a spatial audio engine may benefit from accurately characterizing a reverberation of the user's room.

Figure 1:
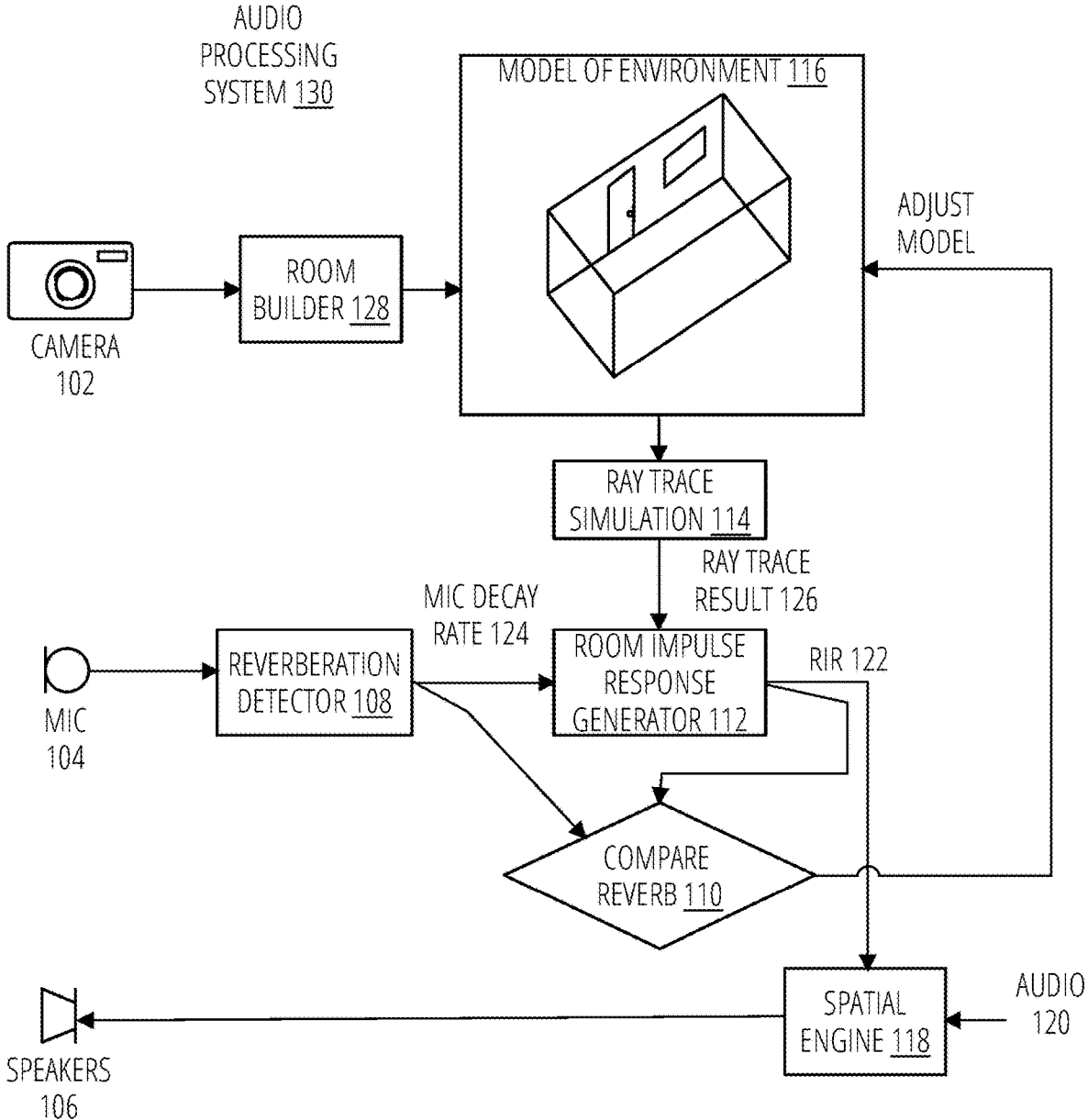
FIG. 1 illustrates an audio processing system that calibrates audio to an environment of a user, in accordance with some aspects.

FIG. 1 illustrates an audio processing system 130 that calibrates audio to an environment of a user, in accordance with some aspects. The audio processing system 130 may include a headphone set, a desktop or laptop computer, a television, a smart speaker, a mobile phone, a tablet computer, a head-mounted display, smart glasses, or other audio processing system. In some aspects, the audio processing system includes two or more audio processing systems that are communicatively coupled to each other through a communication protocol, such as, for example, Wi-Fi, TCP/IP, Bluetooth, or other communication protocol. The operations described here and in other sections may be distributed among the two or more audio processing systems.

The audio processing system 130 may perform a ray trace simulation 114 based on a model of an environment 116. The model may include a three-dimensional representation of the space that the user is currently present in. The model of the environment may be generated from images of the environment that are captured by a camera 102. For example, an audio processing system may include a camera 102 that captures images of a user's environment.

At room builder block 128, the audio processing system may analyze the images of the user's environment and reconstruct the user's room. The audio processing system may apply a three-dimensional reconstruction algorithm and/or computer vision to the images to reconstruct the user's environment. For example, the 3D reconstruction algorithm or computer vision may detect presence of a wall, a floor, a ceiling, furniture, doors, windows, openings, curtains, carpets, humans, animals, and/or other objects or surfaces in the user's environment. Computer vision may include deep learning based object recognition algorithms that may be trained to detect and classify objects and/or materials of surfaces in the user's environment. The audio processing system may assign an absorption coefficient to surfaces in the environment, based on the material of the surface. For example, a curtain may have an absorption coefficient of X, while a painted wall may have a lower absorption coefficient of Y. The absorption coefficient may be assigned through using a look-up table or other technique. The user's environment may be reconstructed as a three-dimensional mesh.

The audio processing system 130 may perform a ray trace simulation 114 using the model of the environment 116. Ray tracing is an algorithm that may be performed by a computer to simulate how energy (for example, light or sound) moves around in a simulated space. The audio processing system may perform the ray trace simulation using the model of environment 116 as the simulated space. The acoustic energy can be represented by rays that are emitted from a simulated sound source. The paths of each ray are traced in the model of the environment. Tracing of each ray provides information as to how particles or waves will travel in such an environment. Ray tracing characterizes the behavior of the waves or particles by repeatedly advancing idealized narrow beams called rays through the medium by discrete amounts. The simulation can include one or more sound sources and one or more detectors, each having a respective position in the model of the environment. A source can emit rays that move in given direction until it hits a surface and/or detector. Each time the ray hits a surface it can reflect to another direction, however, some of the energy that is associated with the ray can be absorbed. How much energy the ray loses can depend on an absorption coefficient of the surface that the ray bounces off. Different surfaces in the model of the environment can have different absorption coefficients. The reflected ray can have a direction that is determined based on the direction of the ray, the shape of the surface, and an angle at which the ray hits the surface. Further, ray energy may dissipate as it travels through simulated medium (e.g., air). If the ray (either direct or reflected) falls below a threshold level of energy, then the ray can be terminated. Typically, when all rays are counted and/or terminated, the ray trace simulation is complete. In some aspects, however, the audio processing system may perform the simulation for a limited duration, ending prior to when all rays are counted and/or terminated. The remaining behavior of the energy may be estimated, as described in other sections. The simulation duration may be adjusted dynamically, for example, based on compute resources that are available. Initial ray directions can be determined, for example, based on the room geometry of the listening area, and/or the positions of the sound sources relative to the listener. In some aspects, the ray directions may be determined as randomly being emitted from the listener location in all directions. In some aspects, they may be launched from the listener location to target certain directions, e.g., by specifying density in different directions.

The ray trace simulation may generate a ray trace result 126 that may include various metadata and a simulated portion of a room impulse response that is a result of the energy counted by one or more detectors during the simulation. At room impulse generator block 112, the audio processing system 130 may generate a room impulse response 122 based at least on the ray trace result 126. For example, the audio processing system can form a hybrid room impulse response that includes a first portion that is a simulated portion of the room impulse response and a second portion that may be determined by deriving a decay model from the metadata of the ray trace result 126, as described in other sections.

Additionally, the audio processing system 130 may use the reverb decay rate 124 determined from audio analysis of the user's environment, to estimate the second portion of the room impulse response. For example, audio processing system 130 can sense one or more sounds in the user's environment with one or more microphones 104. At reverberation detector block 108, the audio processing system can analyze the acoustic energy in the microphone signals at different frequency bands, to determine a frequency dependent reverberation decay rate 124, such as, for example, RT60. It should be understood that a decay rate describes a time for acoustic energy (e.g., in decibels) to dissipate a given amount of decibels (e.g., 60 dB for RT60). As such, a decay rate can also be understood also as a decay time. Further, decay rates for other energy quantities may be determined for aspects of the present disclosure, such as RTX, which may be understood as the time that is estimated or calculated for that energy to dissipate 'X' decibels.

At compare reverb block 110, the audio processing system can detect a difference between the decay rate of the environment 124 that is determined based on the one or more microphones 104 and a second decay rate of the environment that is detected from the room impulse response 122 which is generated through the ray trace simulation 114 with the model environment.

For example, the audio processing system can simulate the reverberation decay rate of the environment by applying the room impulse response 122 to a sound and then compare this simulated decay rate with the microphone-based decay rate 124 as detected from the microphone signals. The audio processing system 130 may modify the model of the environment 116 based at least on the decay rate 124 of the environment and the room impulse response 122 of the environment which is generated from the ray trace simulation. The model may be modified in a manner that reduces the difference between the decay rate 124 and the simulated room impulse response 122.

For example, if the simulated decay rate from room impulse response 122 is faster than the decay rate 124 (e.g., it has a smaller RT60), then the audio processing system can reduce the surface absorption of the model of the environment. If the simulated decay rate is slower (e.g., it has a larger RT60), then the audio processing system can increase the surface absorption of the model of environment 116. Ray trace simulations may be performed iteratively with the modified version of the model of environment 116 to calibrate the room impulse response 122 to the user's environment.

In some aspects, the ray trace simulations may be performed repeatedly, with a modified version of the model, until the difference between the microphone-based decay rate 124 and the simulated decay rate satisfies a threshold amount (e.g., within 'x' %). In some aspects, the ray trace simulations and the visual based room building (at block 128) may be performed repeatedly such that the model of the environment is updated over time based on both the images of the environment and the ray trace simulation. For example, an audio processing system may include a wearable device or other device that may move around a room. As the system moves in the room, the camera 102 may generate images from different angles and provide a more accurate representation of the shape and size of the room, as well as objects and surface materials in the room. Further, the surface absorption of the model may be adjusted based on audio feedback (e.g., decay rate 124), which in turn, provides an improved room impulse response 122.

At spatial engine 118, the audio processing system 130 can apply the room impulse response 122 to an audio signal 120. The spatial engine 118 can also include other spatial filters such as one or more HRIRs. The impulse responses may be applied to the audio signal by convolving the audio signal with the impulse responses to generate a left audio signal and a right audio signal. These audio signals, which may be collectively referred to as binaural audio, may be used to drive speakers 106. Speakers 106 may include a left speaker and a right speaker of a headphone set. The headphone set speakers may be worn in-ear, on-ear, or over-ear. In some aspects, audio signal 120 may be associated with other audio signals that each represent a sound source in an object-based audio asset. The ray trace simulation 114 and other blocks shown may be performed for each sound source, and the sound sources may be combined together prior to playback.

In some aspects, audio signal 120 may be accompanied by a visual work. The audio signal may be collectively referred to as an audiovisual work. The audiovisual work may be a movie, a television show, a game, a sports event, or other audiovisual work. In some aspects, the audiovisual work may be presented by the audio processing system in an augmented reality, mixed reality, or virtual reality environment. In the case of augmented or mixed reality, the calibrating of the room impulse response to the environment of the user may be particularly beneficial, given that the physical surroundings of the user are visible to the user and the audio work is immersed in this physical surrounding.

Figure 2:
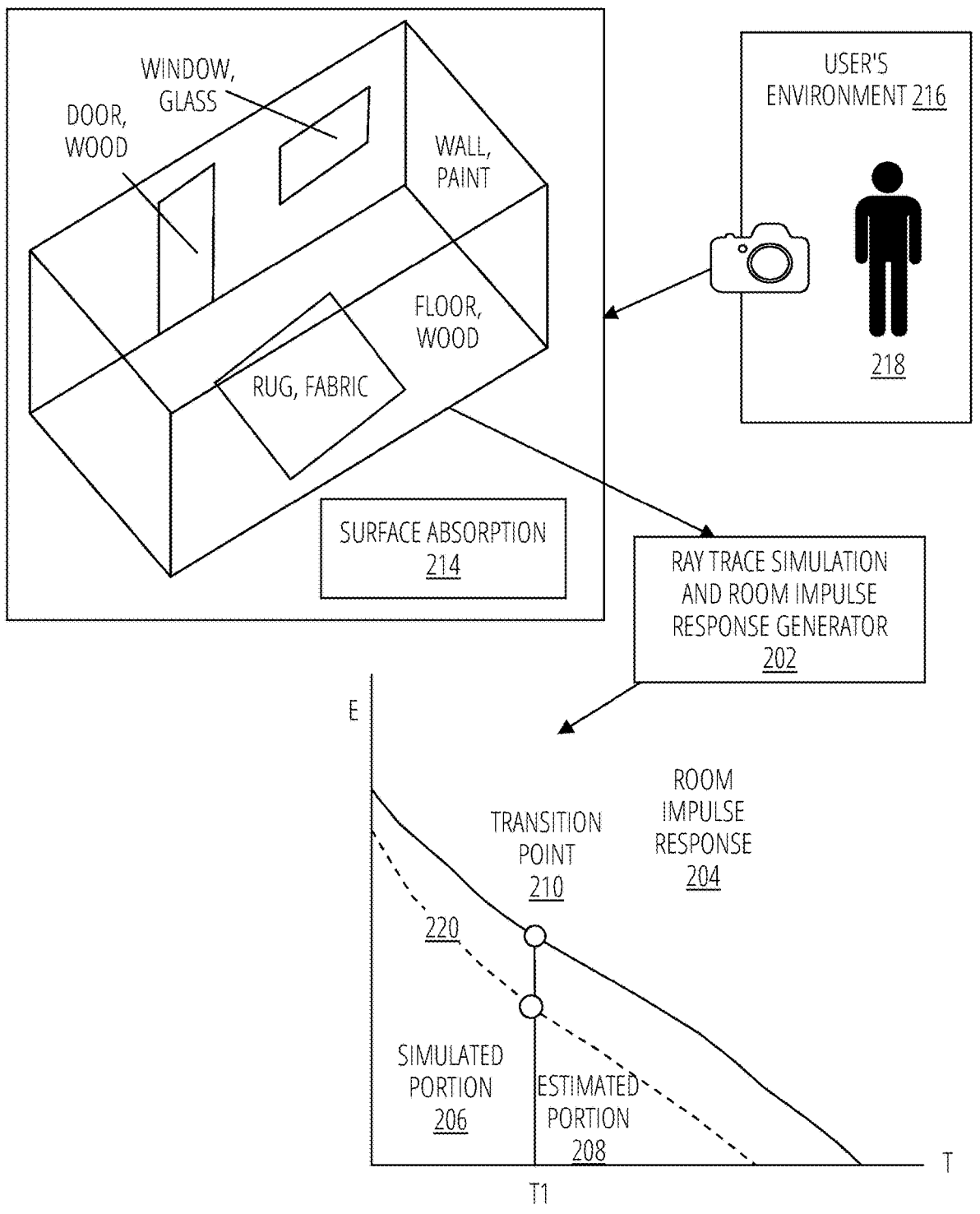
FIG. 2 illustrates a model of an environment and a room impulse response, in accordance with some aspects.

FIG. 2 illustrates a model of an environment and a room impulse response, in accordance with some aspects. A user 218 may be present in an environment 216 such as, for example, a living room, a kitchen, a gymnasium, a concert hall, or other indoor or outdoor environment. The model 212 can be reconstructed as a wire mesh, based on camera images taken of the user's environment 216, as described. The model 212 can include objects and materials, for example, a door made from wood, a window made of glass, a painted wall, a wood floor, a fabric rug, or other objects and materials. Surface absorption data 214 can include absorption coefficients that are assigned to each surface based on the material. For example, the surface of the wood door may be assigned a absorption coefficient 'x', and the fabric rug may be assigned an absorption coefficient 'y'. These differences in surface absorption within the model 212 serve to characterize the unique room impulse response of the user's environment.

At block 202, a ray trace simulation simulates acoustic energy by emitting rays that travel and reflect in the model of the environment 212. From the results of the ray trace simulation, a room impulse response 204 may be generated. The room impulse response may include a simulated portion 206 and an estimated portion 208. The simulated portion can begin at a time T=0 to T1. The estimate portion may continue at T1 until the acoustic energy is dissipated.

The simulated portion 206 may include an early portion of the impulse response. This early portion may be determined directly by counting ray energy when it passes one or more detectors in the ray trace simulation. Ray tracing, however, can be computationally heavy. As such, an estimated portion 208 of the impulse response can be determined based on metadata from the ray trace simulation.

This estimated portion 208 of the room impulse response 204 may be determined by applying a decay model to metadata from the ray trace simulation. For example, at room impulse generator block 202, an audio processing system can obtain the free path distribution of rays, an effective surface area counted each time a ray contacts a surface, and surface absorption distribution that results from the ray trace simulation.

The audio processing system can derive a decay model from this metadata. The decay model may include physics-based relationships between the free path distribution, the surface area, and the surface absorption, to determine an equivalent volume of the model and an equivalent absorption area of the model of the environment. The equivalent absorption area may be understood as an area (m^2) that represents a room's entire sound absorption, which can include walls, ceilings, furniture, drapes, or other objects in the room.

The decay model can be applied to the equivalent volume and the equivalent absorption area to determine a reverberation decay rate of the estimated portion 208. The decay model may include accepted relationships between decay rate, volume, and equivalent absorption area. As such, a decay rate can be determined from the result of the ray trace simulation, however the starting energy level of the estimated portion 208 may not be given by such a decay model, and such a level may be difficult to determine from the microphone signal alone. In this regard, the impulse response generator may use the tail end of the simulated portion 206 as a transition point 210 from which the estimated portion 208 may start from. Further, as the model of environment 212 becomes refined through one or more iterations of ray tracing and microphone-based reverberation decay correction, this transition point 210 may also be refined to provide an improved transition point 210 for the estimated portion 208 to start from. In such a manner, the decay rate determined from microphones is used to influence the model materials, which improves the accuracy of the simulated early response 206. This bootstrapped early response provides the level of the reverberation (e.g., transition point 210) of the early response, which is otherwise difficult to attain. For example, without the input from the microphones that adjusts the model, the simulated portion may have a different decay profile 220 which then results in a different transition point and a different starting point for the estimated portion 208 as shown with the dotted line. The resulting estimated portion may less accurately represent the user's environment. Thus, the room impulse response 204 may be improved to more accurately characterize the user's environment 216.

In such a manner, the room impulse response 204 may be determined with a decay rate and energy that matches or resembles that of the user's environment, using both visual and audio information to fine tune the room impulse response.

It should be understood that some aspects may not be shown in each and every figure, and that some of the aspects from the various figures may be combined although not explicitly shown as such. For example, details regarding the ray trace results and room impulse generation may not be shown in the example of FIG. 2 for clarity. Similarly, adjustment to the model of environment 212 may be performed as described with respect to other aspects.

Figure 3:
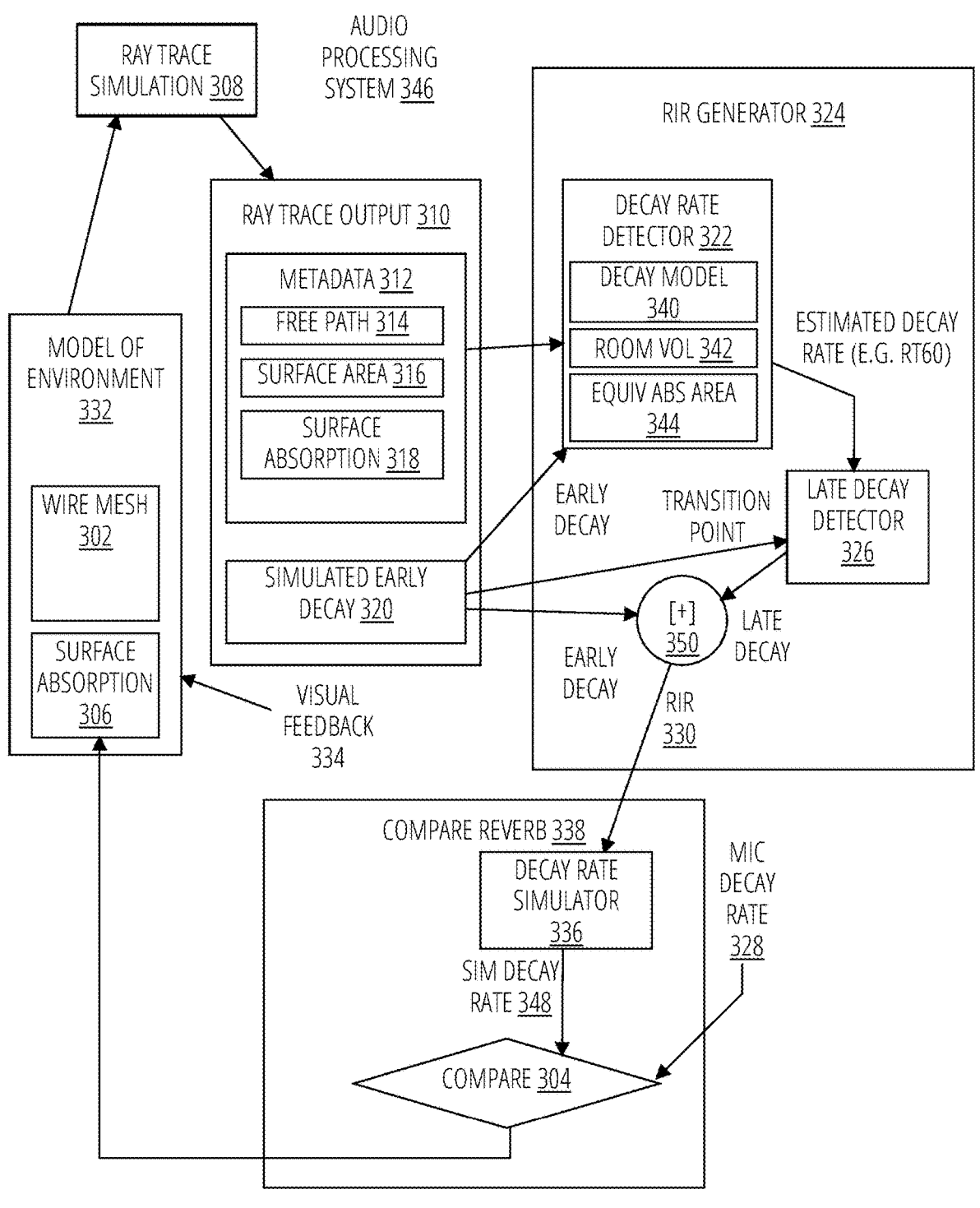
FIG. 3 illustrates a ray trace simulation and generation of a room impulse response, in accordance with some aspects.

FIG. 3 illustrates a ray trace simulation 308 and room impulse response generation, in accordance with some aspects. At block 308, a ray trace simulation is performed using a model of an environment 332. The model 332 that is modeled after an environment that a user is present in. The model can include a 3D computer-generated representation of the user's surroundings, such as a 3D wire mesh 302. The representation can include the geometry and size of a room, openings, and objects in the room. The model 332 can include surface absorption 306 which may include acoustic absorption coefficients of each surface in the model 332. The model 332 may be generated from visual feedback 334 such as camera images taken of the user's current environment.

As discussed, the ray trace simulation 308 may include projecting rays from one or more sources in a simulated acoustic space. In some aspects, a ray trace simulation is performed for each sound source of an object-based audio work. In the ray trace simulation, one or more detectors may be placed to represent a listener position. The rays that pass through the one or more detectors are counted, as well as an energy that is associated with each ray. This operation can be referred to as an energy detection operation and may yield a simulated early decay portion 320 of a room impulse response. This simulated early decay portion 320 can correspond to the simulated portion 206 of room impulse response 204 which is shown in FIG. 2.

The simulated early decay portion 320 of the impulse response may resemble or match the effect of the acoustic space on the sound source as experienced from the perspective of a listener at the position of the one or more detectors, for the duration of time that the simulation is performed. This portion may be empirically determined through the energy detection operation of the ray trace simulation. The ray trace simulation may have a reduced number of rays and be performed for a reduced period of time. For example, the ray trace simulation may be performed with 10000 or less rays. In other examples, the ray trace simulation may be performed with less than 1000 rays. Further, the ray trace simulation may be exited without waiting for the energy of each of the rays to decay past a threshold. As discussed with respect to FIG. 2, the remaining estimated portion of the impulse response (not determined through the energy detection operation) may be determined by using the transition point as a starting energy level, and tapering the energy over time according to an estimated reverberation decay rate.

The free path distribution 314 may include, for each ray, a path distance that the ray travels before the ray comes in contact with a surface. In some aspects, the free path distribution can include an average distance that a ray travels between surfaces. In some aspects, the free path distribution can include groupings or bins of rays that are grouped based on their free path, to show which free path distances are common and how likely some rays might deviate from common free path distances. The surface area 316 can be an area that is counted each time the ray hits a surface, and can be understood as an effective or counted surface area.

The surface absorption distribution 318 can include an amount of energy absorbed for each ray, each time the ray reflects off of a surface in the acoustic space. In some aspects, the surface absorption distribution can include an average of the energy absorbed for all rays per reflection. In some aspects, the absorption distribution can include groupings or bins of rays that are grouped based on how much acoustic energy is absorbed when reflecting off of a surface in the acoustic space, to show which absorption values are common and how likely some collisions are to deviate from those common absorption values.

The free path distribution 314 and/or surface absorption distribution 318 an each be represented by a histogram. For example, the free path distribution can include a histogram that has bins of the distances traversed prior to contacting a surface, plotted against the hit count or density of the number of rays that fall within each bin. Similarly, the absorption distribution can include a histogram that has bins of energy loss for each reflection plotted against the frequency density of the number of rays that fall within each bin. A histogram can represent a numerical distribution for a data set, showing how most of the rays behave, how far some of the rays deviate from the rest. The free path distribution 314 and absorption distribution 318 can be used to statistically model the effective volume and/or the effective room surface of an acoustic space. Effective room volume and effective room surface can describe how a room would actually influence certain acoustic parameters such as reverberation time, given a room geometry, objects in the room, a position of the sound, and surfaces of the room. The effective room volume and effective room surface may provide a more accurate picture of the acoustics in a room than more general relationships between room volume, surface absorption, and reverberation, given that different regions of a space may contribute to reverberation unevenly, depending on geometry, objects, materials, and/or other factors of the space.

The ray trace simulation 308 can calculate the metadata during the duration of the simulation, and store these parameters in data structures such as, for example, histograms. The metadata can include the frequency bands of the received sound energy, as well as the frequency-dependent energy levels of the received sound energy. Counting refers to storing information of the ray such as time of intersection, energy, direction, and/or other information. For example, a histogram can keep a time and energy for each ray that intersects with the detector. The energy loss of each ray, as well as the number of rays that pass through each detector at different times, and the direction of those rays, may represent the impulse response associated with that sound source (which is represented by a detector). This energy detection operation can characterize an impulse response for the duration that the simulation is performed, however, this can be computationally costly. As such, the energy detection operation may be performed for a limited duration and with limited number of rays to reduce the computational overhead to determine an early portion of the impulse response. In some aspects, the energy detection operation and the resulting simulated portion of the room impulse response may have a duration of 100 ms or less. This duration may be adjusted dynamically based on compute resources available from audio processing system 346.

At decay rate detector block 322, a decay model 340 may be used to determine a decay rate. The decay model 340 can include one or more algorithms that include mathematical relationships between the metadata parameters 314, 316, and 318 to derive an estimated reverberation decay rate for the estimated portion of the room impulse response. For example, the decay model may be applied to the free path distribution 314 and the counted surface area 316 to determine an effective room volume 342. Similarly, the decay model can be applied to the counted surface area 316 and surface absorption 318 to determine an equivalent absorption area 344.

The equivalent absorption area of a surface can be understood as having a sound power absorption coefficient of unity that would absorb the same amount of sound power in a reverberation room with a diffuse sound field as the surface. In some aspects, the decay model may determine the equivalent absorption area 344 as the product of the area of the surface 316 and the surface absorption 318. A decay model can include algorithmic assumptions regarding the shape of the decay. For example, in some aspects, the decay model includes an exponential decay model, which generates an exponential decay from the metadata. In some aspects, the decay model includes a two-tail decay model that generates a first decay rate and a second decay rate from the input metadata. In some aspects, the decay model can include a noise generator that applies a random and varying quantity to the decay profile. In some aspects, the decay model 340 may include a trained neural network that is trained to receive the metadata as input and create an estimated decay rate from the metadata.

The metadata 312 can be generated from the same ray trace simulation that generated the simulated early decay 320. The decay model 340 may be applied to the effective room volume 342 and equivalent absorption area 344 to determine or derive an estimated decay rate of the environment. The effective room volume 342 may be determined based on the 'hit rate' of a ray, which can be determined based on the free path of a ray and the speed of sound. This effective room volume may be different than the actual room volume of the 3D model, as it indicates the effective of the room volume on the path of acoustic energy as simulated by the ray trace, rather than the overall room volume of the model of the environment. For example, the higher the hit rate, and/or the higher the absorption, then the faster the acoustic energy will decay in the space, thereby resulting in a faster decay rate (e.g., a shorter tail).

At late decay detector block 326, the transition point may be obtained from the simulated early decay 320 and used as a starting point of the estimated portion of the room impulse response. The transition point provides the starting energy level of the estimated portion of the impulse response (as shown in FIG. 2). Using this starting energy level, the energy level of the estimated portion can taper over time according to the estimated decay rate obtained from decay rate detector 322. The estimated portion, which can be understood as a late decay portion, and the simulated early decay portion 320 can be combined at block 350 to result in the room impulse response 330 that models the acoustic response of the user's environment.

The surface absorption 306 of the model, however, may not fully characterize the actual surface absorption of the user's environment, given that this parameter may be difficult to detect from visual feedback 334 alone. At reverberation compare block 338, the audio processing system 346 may obtain the room impulse response 330 and the mic decay rate 328 determined from microphone signals to improve the accuracy of the model 332. At decay rate simulator block 336, the audio processing system 346 may apply the room impulse response to a test audio signal to obtain a simulated decay rate 348.

At compare block 304, the audio processing system 346 may compare this simulated decay rate 348 to the microphone-based mic decay rate 328. The surface absorption 306 of the model of environment 332 may be adjusted (e.g., increased or decreased) to reduce the difference between the two decay rates. For example, if the simulated decay rate 348 is faster than the microphone-based decay rate 328, then the surface absorption 306 of the model may be reduced. Similarly, if the simulated decay rate 348 is slower than the microphone-based decay rate 328, then the surface absorption 306 of the model may be increased. Surface absorption 306 may be frequency dependent. For example, a single surface may have different absorption coefficients for different frequency bands. The decay rates may be compared for different frequency bands, and surface absorption coefficients may be adjusted per each of the frequency bands.

The adjustment to the surface absorption may be applied evenly across the model of the environment such that absorption differences between surfaces of walls and/or objects are preserved. For example, if the model of environment 332 has a first wall that is bare and painted and a second wall with a large fabric drape across it, then the second wall may be assigned a surface absorption coefficient 'x' that is higher than a surface absorption coefficient 'y' that is assigned to the first wall. Both walls may be adjusted evenly (e.g., with a common correction factor) to increase or reduce the overall equivalent absorption area, however, the absorption differences between the two walls are preserved.

In some aspects, if the difference between the decay rate of the environment and the second decay rate of the environment is greater than a first threshold (e.g., an error of 50% when compared to the reference microphone decay rate 328), then adjusting the surface absorption of the model of the environment includes using a theoretical model to define an equivalent absorption area of the model of the environment. For example, if the difference is greater than the first threshold, this may indicate that an iterative approach to adjusting the model over numerous cycles will consume a large amount of resources. Thus, a closed form theoretical model that may include one or more mathematical expressions and a finite number of operations may be used to directly define the surface absorption parameters of the model to close the gap between the model of the environment and the microphone-based decay rate 328.

In some aspects, if the difference between the decay rate of the environment and the second decay rate of the environment is less than a second threshold (e.g., an error of 20% when compared to the reference microphone decay rate), then adjusting the surface absorption of the model of the environment includes using the theoretical model to predict the equivalent absorption area of the model of the environment. The prediction may be based on an increase or decrease to the existing surface absorption of the model 332. The second threshold may be a smaller difference than the first error. As such, when the difference is high, the audio processing system 346 may adjust the surface absorption without regard to the current values of the surface absorption 306 to quickly close the gap. The total equivalent absorption area may be forced to a given target value. However, while setting the total equivalent absorption area to a specific value, the differences between lower and higher-absorbing materials may still be preserved. When the difference is low, then the audio processing system can fine tune the surface absorption of the model.

In some aspects, if the difference between the decay rate of the environment and the second decay rate of the environment is within the first threshold and the second threshold (e.g., between 50% and 20%), then adjusting the surface absorption of the model of the environment includes using a weighted combination of the defined equivalent absorption area and the predicted equivalent absorption area. The defined equivalent absorption area may use the purely theoretical model to directly define the absorption coefficients, as described above. The predicted equivalent absorption area may use the current surface absorption 306 of the model as a baseline, and increasing or decreasing the current surface absorption based on the theoretical model, as also discussed above.

Figure 4:
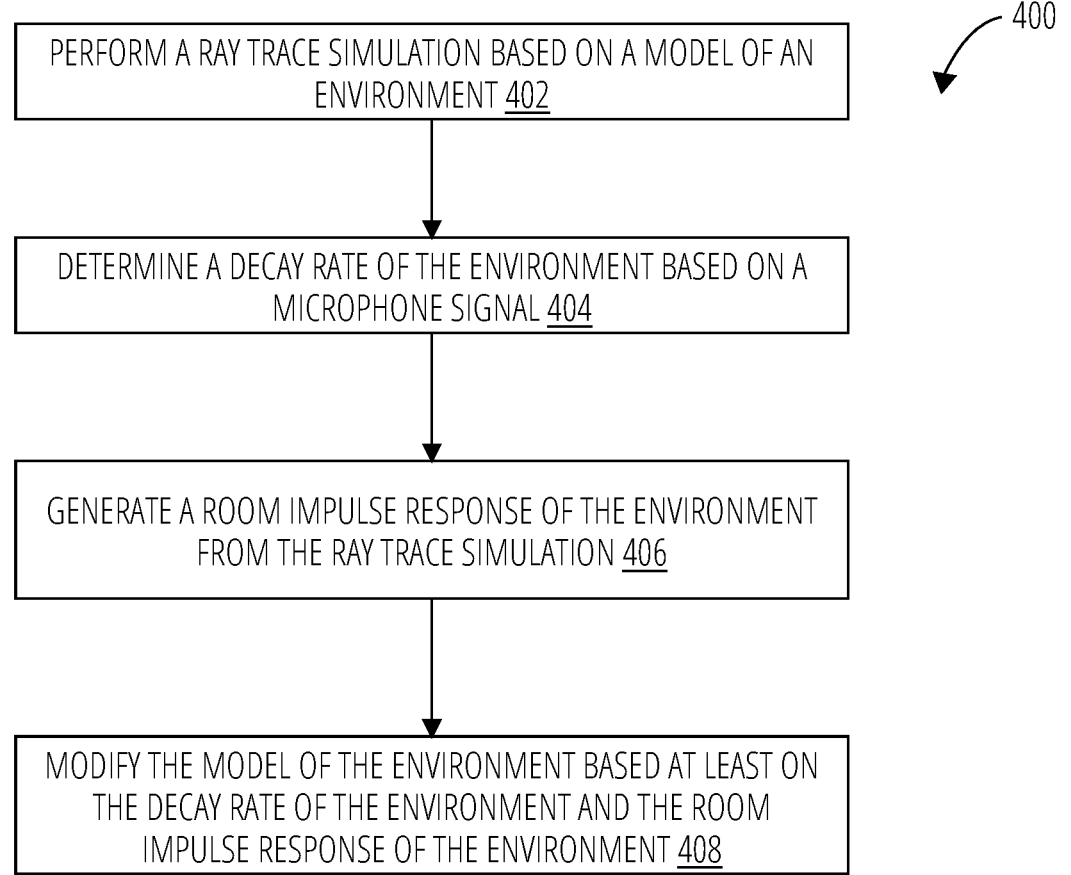
FIG. 4 illustrates a method for calibrating audio to an environment of a user, in accordance with some aspects.

FIG. 4 illustrates a method for calibrating audio to an environment of a user, in accordance with some aspects. The method 400 may be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 402, processing logic performs a ray trace simulation based on a model of an environment. As discussed, the model can be reconstructed based on images. The model may include a three-dimensional representation of a user's surroundings, as well as surface absorption, for example, absorption coefficients for surfaces in the model. The absorption coefficients may differ from one surface to another in the model, depending on the material of the surface.

At block 404, processing logic determines a decay rate of the environment based on a microphone signal. For example, the acoustic energy in the microphone signal may be measured over time to trace the decay of the acoustic energy. In some aspects, the decay may be traced for different sub-bands to determine the reverberation decay rate for each sub-band.

At block 406, processing logic determines a room impulse response of the environment, based at least on results from the ray trace simulation. The room impulse response may have simulated portion that is determined through an energy detection operation of the ray trace simulation. The room impulse response may have an estimated portion that is determined based on metadata results (e.g., a free path distribution, an effective surface area, and an absorption distribution) from the ray trace simulation. For example, the estimated portion may be calculated based on the effective room volume and equivalent absorption area. The effective room volume may be determined from the free path distribution and the effective surface area. The equivalent absorption area may be determined from the effective surface area and the absorption distribution. In some aspects, the absorption distribution may include a mean absorption.

At block 408, processing logic modifies the model of the environment based at least on the decay rate of the environment and the room impulse response of the environment. Surface absorption of the room model may be increased or decreased so that reverberation, as provided by the impulse response, more closely resembles the reverberation as-sensed by the microphone. The comparison of the reverberation and/or the adjustment of the absorption coefficients can be performed for each of a plurality of sub-bands. The adjustment may be performed evenly across the different surfaces of the model, to preserve absorption differences of individual materials as sensed by visual data.

The method may be repeated by processing logic to fine tune the room impulse response of the environment. For example, over each iteration, processing logic may determine a simulated decay rate from the room impulse response and compare this to the microphone-based decay rate of the environment. If the difference satisfies a threshold (e.g., below an error of 'x' %), then the method may exit. The resulting room impulse response may be applied to an audio signal (e.g., at spatial engine block 118 as described with respect to FIG. 1) to spatialize sound. In some aspects, as described, the room impulse response may be applied to the audio signal to impart reverberation in the playback audio, which may serve as a basis for creating the illusion of 'distance', according to a corresponding direct-to-reverberant ratio (DRR).

13

Figure 5:
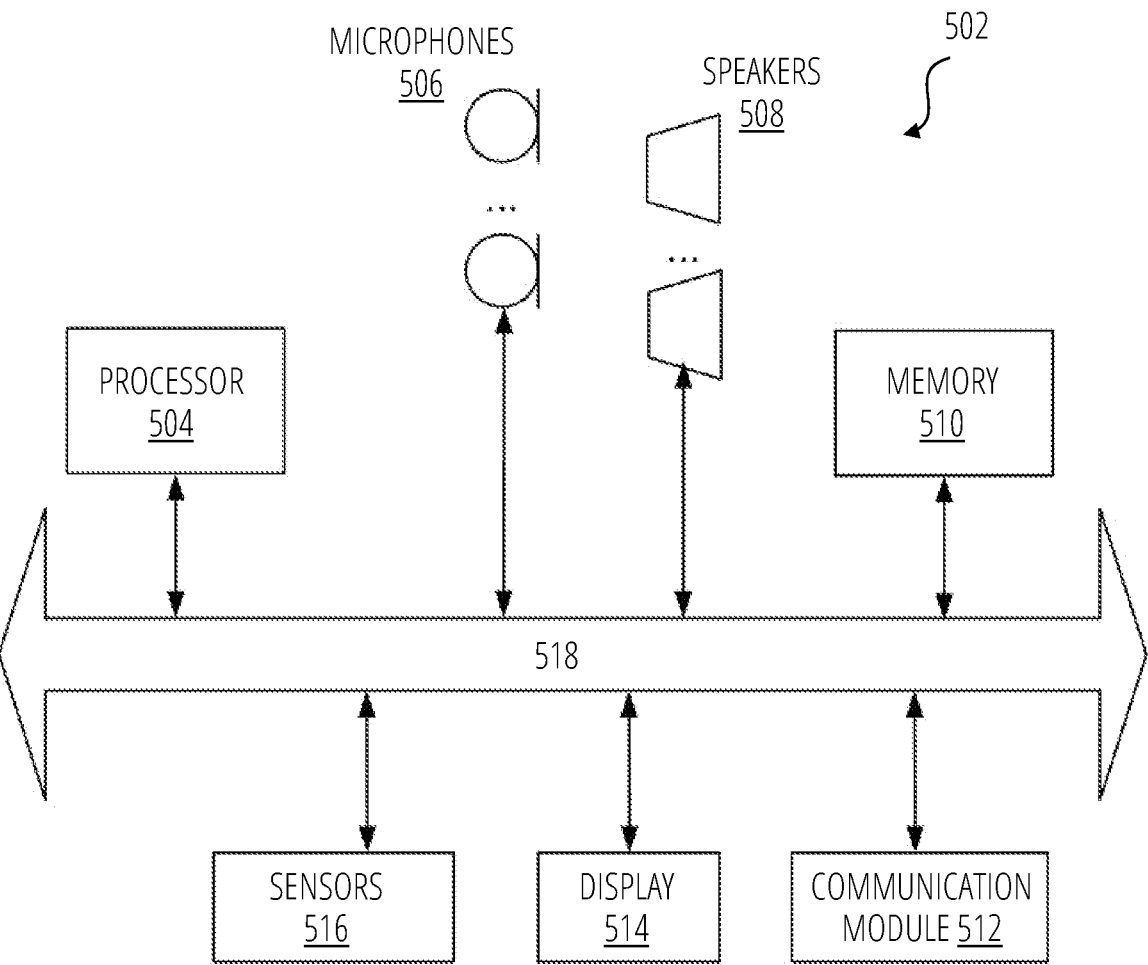
FIG. 5 illustrates an example of an audio processing system, in accordance with some aspects.

FIG. 5 illustrates an example of an audio processing system, in accordance with some aspects. The audio processing system can be a computing device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system can include one or more buses 518 that serve to interconnect the various components of the system. One or more processors 504 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 510 can include Read Only Memory (ROM), volatile memory, and non-volatile memory, or combinations thereof, coupled to the bus using techniques known in the art. Sensors 516 can include an IMU and/or one or more cameras (e.g., RGB camera, RGBD camera, depth camera, etc.) or other sensors described herein. The audio processing system can further include a display 514 (e.g., an HMD, or touchscreen display).

Memory 510 can be connected to the bus and can include DRAM, a hard disk drive or a flash memory or a magnetic optical drive or magnetic memory or an optical drive or other types of memory systems that maintain data even after power is removed from the system. In one aspect, the processor 504 retrieves computer program instructions stored in a machine readable storage medium (memory) and executes those instructions to perform operations described herein.

Audio hardware, although not shown, can be coupled to the one or more buses in order to receive audio signals to be processed and output by speakers 508. Audio hardware can include digital to analog and/or analog to digital converters. Audio hardware can also include audio amplifiers and filters. The audio hardware can also interface with microphones 506 (e.g., microphone arrays) to receive audio signals (whether analog or digital), digitize them when appropriate, and communicate the signals to the bus.

Communication module 512 can communicate with remote devices and networks through a wired or wireless interface. For example, communication module can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "module", "engine", "detector", "builder", "processor", "unit", "renderer", "system", "device", "filter", "engine", "block", "generator", "simulation", "model", "compare", and "component", are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:
performing a ray trace simulation based on a model of an environment;
determining a first decay rate of the environment based on a microphone signal;
generating a room impulse response of the environment from the ray trace simulation;
detecting a second decay rate of the environment from the room impulse response of the environment; and modifying the model of the environment by adjusting a surface absorption of the model of the environment such that a difference between the first decay rate and the second decay rate is reduced.

2. The method of claim 1, wherein adjusting the surface absorption comprises:
reducing the surface absorption when the second decay rate is faster than the first decay rate; or
increasing the surface absorption when the second decay rate is slower than the first decay rate.

3. The method of claim 1, wherein a simulated portion of the room impulse response transitions to an estimated portion of the room impulse response at a level of reverberation that is determined through performing the ray trace simulation with a modified version of the model of the environment.

4. The method of claim 1, further comprising spatializing an audio signal using the room impulse response, resulting in a left audio signal and a right audio signal that is used to drive a left speaker and a right speaker of a headphone set.

5. The method of claim 1, wherein the model of the environment is generated from images of the environment that are captured by a camera.

6. The method of claim 5, wherein the method is performed repeatedly such that the model of the environment is updated over time based on the images of the environment and the ray trace simulation that are updated with each iteration.

7. The method of claim 1, wherein the model of the environment comprises a material of a surface of the model, wherein the surface absorption comprises one or more absorption coefficients that are assigned to the surface of the model based on the material.

8. The method of claim 1, wherein the surface absorption is applied evenly across the model of the environment.

9. The method of claim 1, wherein the surface absorption of the model is frequency dependent.

10. The method of claim 1, wherein if the difference between the first decay rate of the environment and the second decay rate of the environment is greater than a first threshold, then adjusting the surface absorption of the model of the environment includes using a theoretical model to define a first equivalent absorption area of the model of the environment.

11. The method of claim 10, wherein if the difference between the first decay rate of the environment and the second decay rate of the environment is less than a second threshold, then adjusting the surface absorption of the model of the environment includes using the theoretical model to predict a second equivalent absorption area of the model of the environment.

12. The method of claim 11, wherein if the difference between the first decay rate of the environment and the second decay rate of the environment is within the first threshold and the second threshold, then adjusting the surface absorption of the model of the environment includes using a weighted combination of the first equivalent absorption area and the second equivalent absorption area.

13. A computing device, comprising:
one or more microphones that generate corresponding one or more microphone signals;
a processor; and
a memory storing instructions that, when executed by the processor, cause the computing device to perform the following operations:
perform a ray trace simulation based on a model of an environment;

determine a first decay rate of the environment based on the corresponding one or more microphone signals;

generate a room impulse response of the environment from the ray trace simulation;

detecting a second decay rate of the environment from the room impulse response of the environment; and modify the model of the environment by adjusting a surface absorption of the model of the environment such that a difference between the first decay rate and the second decay rate is reduced.

14. The computing device of claim 13, wherein adjusting the surface absorption comprises:

reducing the surface absorption when the second decay rate is faster than the first decay rate; or increasing the surface absorption when the second decay rate is slower than the first decay rate.

15. The computing device of claim 13, wherein a simulated portion of the room impulse response transitions to an estimated portion of the room impulse response at a level of reverberation that is determined through performing the ray trace simulation with a modified version of the model of the environment.

16. The computing device of claim 13, further comprising spatializing an audio signal using the room impulse response, resulting in a left audio signal and a right audio signal that is used to drive a left speaker and a right speaker of a headphone set that are integral to the computing device.

17. The computing device of claim 13, wherein the model of the environment is generated from images of the environment that are captured by a camera of the computing device.

18. The computing device of claim 17, wherein the operations are performed repeatedly such that the model of the environment is updated over time based on the images of the environment and the ray trace simulation that are updated with each iteration.

19. The computing device of claim 13, wherein the model of the environment comprises a material of a surface of the model, wherein the surface absorption comprises one or more absorption coefficients that are assigned to the surface of the model based on the material.

20. The computing device of claim 13, wherein the surface absorption is applied evenly across the model of the environment.

* * * * *